United States Patent [19]

Ananthanpillai

[11] Patent Number: 5,333,308

[45] Date of Patent: Jul. 26, 1994

[54] METHOD AND APPARATUS FOR OPERATING A COMMUNICATION NETWORK MONITOR ARRANGEMENT

[75] Inventor: Rajagopalan Ananthanpillai, Hazlet, N.J.

[73] Assignee: AT&T Bell Laboratories, Murray Hill, N.J.

[21] Appl. No.: 109,864

[22] Filed: Aug. 20, 1993

Related U.S. Application Data

[63] Continuation of Ser. No. 665,055, Mar. 6, 1991, abandoned.

[51] Int. Cl.[5] ............................................. G06F 15/16
[52] U.S. Cl. ................................... 395/575; 364/266; 364/266.5
[58] Field of Search ........................................ 395/575

[56] References Cited

U.S. PATENT DOCUMENTS 4,545,011 10/1985 Lyon et al. ........................... 364/200
4,901,274 2/1990 Maejima et al. ..................... 364/900

OTHER PUBLICATIONS

Software Tools and Components, by R. F. Bergeron and M. J. Rochkind, *The Bell System Technical Journal*, vol. 61, No. 6 Jul-Aug, 1982.

*An Introduction to Operating Systems*, Second Edition by Harvey M. Deitel, ©1990 Addison-Wesley Publishing Co. § 81.6–18.11.7.

*The Norton Utilities* Advanced Edition Version 4.5, ©1988 Peter Norton Computing, Inc., pp. 127–130.

"Computer Architecture & Organization," Second Ed. by J. P. Hayes ©1988, McGraw-Hill, Inc., pp. 664–670.

*Primary Examiner*—Vincent P. Canney
*Attorney, Agent, or Firm*—John A. Caccuro

[57] ABSTRACT

A network monitor system uses status programs to recurrently monitor the operational status of subsystems of a communication network. When a nonnormal response is received from a status program a user-specified associated repair program is enabled to repair the malfunction. An internal table recurrently derived from a user-defined table specifies when the various status programs should be executed. The system enables the user or administrator to update the user-defined table at any time.

16 Claims, 4 Drawing Sheets

FIG. 4

USER-DEFINED TABLE — 203

| LABEL | TIME INTERVAL | STATUS PROGRAM | REPAIR PROGRAM | COMMENTS |
|---|---|---|---|---|
| A | 30 | A -T60 -C25 -P/MAIL/EDIQ | A -T5 -V | |
| A | 60 | A1 -C | A1 | |
| B | 30 | B | B | |
| ⋮ | ⋮ | ⋮ | ⋮ | |
| X | 30 | X -T | X | |

204 — INTERNAL TABLE – TIME CYCLE A

| ID | TIME INTERVAL | STATUS PROGRAM | REPAIR PROGRAM | LINK PTR |
|---|---|---|---|---|
| A | 30 | A | A | |
| A | 60 | A1 | A1 | |
| B | 30 | B | B | |
| ⋮ | ⋮ | ⋮ | ⋮ | |
| X | 30 | X | X | |

204A — INTERNAL TABLE – TIME CYCLE B

| ID | TIME INTERVAL | STATUS PROGRAM | REPAIR PROGRAM | LINK PTR |
|---|---|---|---|---|
| A | 30 | A | A | |
| B | 30 | B1 | B | |

METHOD AND APPARATUS FOR OPERATING A COMMUNICATION NETWORK MONITOR ARRANGEMENT

This application is a continuation of application Ser. No. 07/665,055, filed on Mar. 6, 1991, now abandoned.

TECHNICAL FIELD

This invention relates to communication networks and, more particularly, to a method of and apparatus for operating a network monitor arrangement for use therewith.

BACKGROUND OF THE INVENTION

As communication networks grow in complexity, there is an increased need to provide a network management system to monitor, manage and administer network elements. In the past, some network management systems generated alarms and error messages which were then collected and reported to a system administrator's console. The administrator or user would then take corrective action which often required that a repair program be activated manually.

When the communication network is large and has a variety of diverse capabilities, there may exist a large number of status monitoring and repair programs which are utilized by the network management system. Moreover, because network capabilities are constantly being changed or added, corresponding changes are often required to be made to the associated status and repair programs. Undesirably, making these changes or additions to the status and repair programs requires that the network management system be recompiled, linked, and retested which involves disabling parts or all of the network.

SUMMARY OF THE INVENTION

In accordance with the present invention, a network management arrangement enables a repair program to be invoked automatically by its associated status program when a non-normal status is returned by the status program.

In one embodiment, status programs of the network monitor system are recurrently executed to monitor the operating status of a communication network. When a non-normal status response is returned from a status program, an associated repair program is enabled to repair the non-normal status condition. According to one feature of the invention, a user-defined table associates status and repair programs with different subsystems of the network and specifies the time when each of the status programs should be executed. Another feature enables the user to specify one or more test parameters of the status programs. An internal table recurrently derived using entries from the user-defined table specifies to the network monitor a predefined time when a status program should be executed. Because the network monitor system uses the internal table to control its operations, the user-defined table can be changed by the user (i.e., system administrator) at any time.

BRIEF DESCRIPTION OF THE DRAWING

In the drawing

FIG. 4 illustrates a user-defined table and an internal table derived therefrom and used to specify job tasks to be perforated by the network monitor.

DETAILED DESCRIPTION

Figure 1:
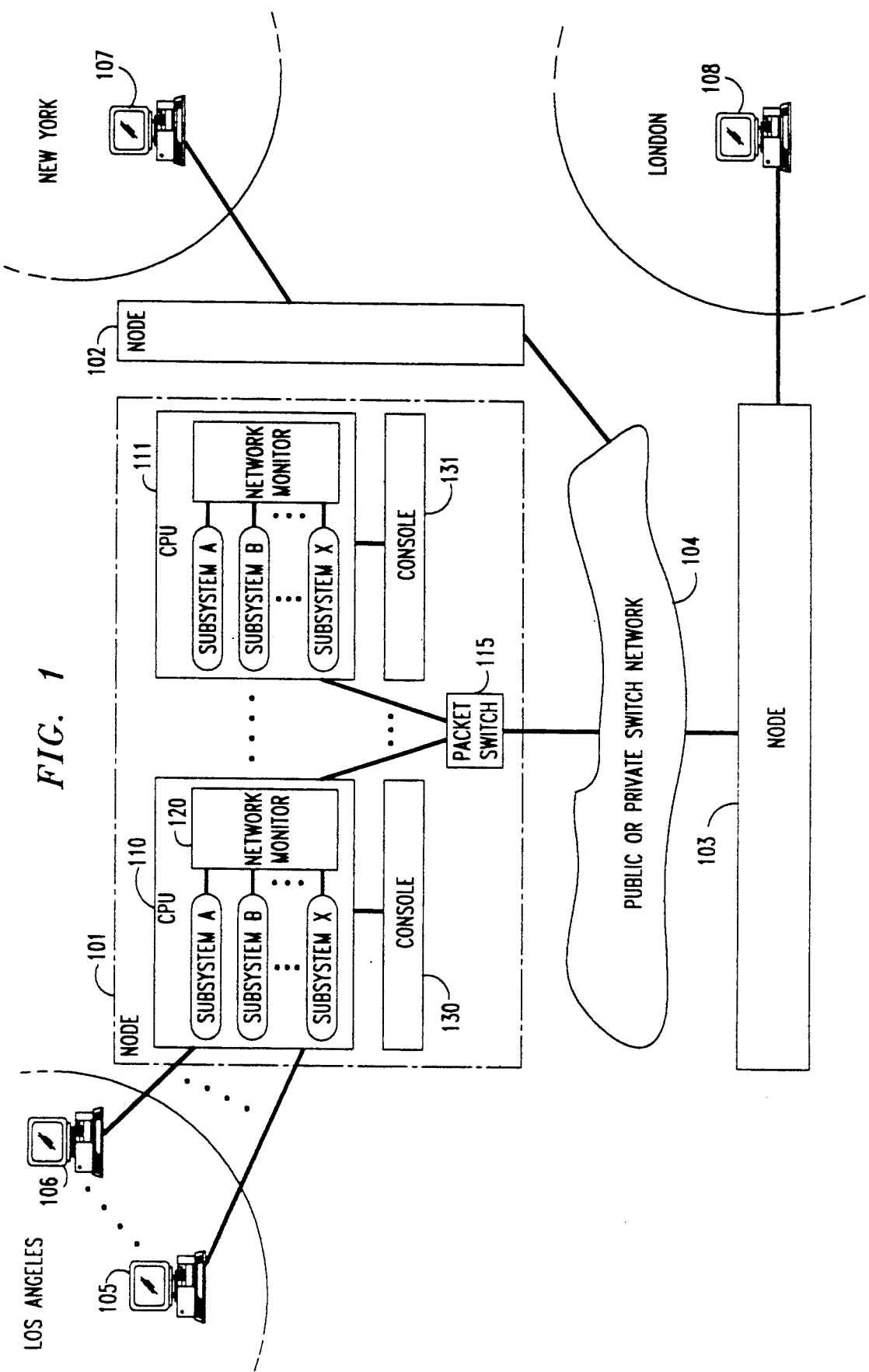
FIG. 1 is a block diagram of a communication network in which the present invention ay be utilized.

Shown in FIG. 1 is a block diagram of a communications network (e.g., an electronic store and forward mail network) which may utilize the present network monitor arrangement or system. The data network may, illustratively, be utilized for a variety of electronic data communication services such as enhanced facsimile service, electronic data interchange (EDI), telex service, synchronous data services, etc., each of which can be operated as a different subsystem at each node of the network.

The network may, illustratively, include a plurality of nodes 101–103 which are interconnected via a public or private switch network 104. Node 101 may serve a first location (e.g., Los Angeles), node 102 a second location (New York) and node 103 a third location (London). A subscriber (e.g., 105) may send a data transmission (e.g., telex) to one or more subscribers connected to the same node (e.g., subscriber 106) or connected to a distant node (e.g., subscriber 107 at node 102 or subscriber 108 at node 103).

Each node (e.g., 101) may, illustratively, include one or more central processing units (CPUs) (110, 111) which process the user or subscriber's request. These CPUs may also perform functions such as encryption, decryption, data compression, data expansion, error correction, etc. These CPUs also serve to interface the subscribers (e.g., 105, 106) to the packet switch (e.g., 115) which provides a data connection to network 104 and ultimately to another node (e.g., 103) and subscriber 108.

Each CPU may include a plurality of subsystems (which may themselves include programs) A–X which may, illustratively, each operate a different data communication service. For example, subsystem A may control an enhanced facsimile service, subsystem B may control a telex service, and subsystem X may control an EDI service.

Each CPU 110, 111 has associated therewith a console 130 and 131, respectively, for outputting status to the system administrator and permitting the system administrator to enter control commands to the network monitor.

By way of illustration, we generally describe the network operation to enable an enhanced broadcast facsimile transmission from a subscriber 105 to recipient subscribers 106, 107 and 108. The subscriber 105 dials a request to activate a broadcast facsimile service. Thereafter, the subscriber 105 enters the parameters such as time of delivery, priority, and a list of facsimile output recipients (i.e., subscribers 106, 107 and 108) as well as the facsimile message itself. Processor CPU 110 processes the subscriber 105 request and broadcasts or sends the received facsimile message to the specified recipient subscribers 106, 107 and 108. The CPU 110 would attempt delivery to the recipients in accordance with the sender's request, as specified by the various parameters entered when the service request was made.

During the course of handling various subscriber requests, the operating status of subsystems A-X will constantly be changing. For example, certain input or output queues may become overloaded resulting in operational overloads or other abnormal conditions. In the prior art, these data-network-overload or other malfunction conditions were typically not discovered until a disgruntled subscriber called in and indicated that a problem condition existed. Other prior art systems may automatically detect these malfunction conditions, but do not have the capability to automatically diagnose the problem behind the malfunction condition.

In accordance with the present invention, network monitor program 120 (also referred to herein as network monitor system) is arranged to monitor each of the operating subsystems A-X using a separate monitor or status program (e.g. 207 of FIG. 2) for each subsystem. Each status program has associated with it a time parameter (e.g., 452 of FIG. 4) in the user-defined table for determining when to run the status program and includes user-specified test parameters with the actual program name (e.g., as shown in 207 of FIG. 2 status program A -t -c -p . . . ) where A is the name of the status program and -t, -c, and -p are user-specified test parameters, where -t could be a threshold value for the age of the queue, -c could be a threshold value for the count or length of the queue, -p path of the queue. These test parameters are optional and are used for determining a normal and/or an acceptable status of an associated operating subsystem. If no test parameter values are specified or inputted by the system administrator, the status program utilizes its preprogrammed default test parameters. The units for each of the test parameters -t, -c, and -p are predefined in the status program. For example:

Status A-P/MAIL/EDIQ -C25 -t60

Where: -P/MAIL/EDIQ is a UNIX system path from current directory to the EDI subsystem queue;

-C25 indicates to the status program that monitor program 120 should set an alarm when the EDI queue length is more than 25;

-160 indicates to the status program that the network monitor program 120 should set an alarm when the age of any of the message elements of EDI queue is older than 60 minutes.

According to another aspect of the present invention, each operating subsystem A-X has associated therewith a repair program (e.g., 208 of FIG. 2) for repairing a malfunction in the associated subsystem. A user-defined table (e.g., 203 of FIG. 4) lists the status program and the associated repair program (may be one or more programs) for each subsystem of the CPU.

The network monitor program 120 periodically accesses the user-defined table to execute one or more status programs in accordance with the user-specified time parameters listed for each status program. Generally, the network monitor system administrator specifies the test parameter value for each status program.

When the results of the status program indicate a non-normal status of the associated subsystem, the associated one or more repair programs are activated to repair the underlying problem.

Before proceeding with the detailed operating description of the present invention, it should be recognized that the apparatus and method of the invention may be adapted for use with a variety of different monitor systems or networks. Since these various monitor systems or networks may utilize a variety of hardware and programming techniques, no attempt is made to describe the existing programs used to control these various systems. However, using the following description as a guide, the operations of the present invention can be readily integrated into the control structure of the various units of FIG. 1, and tailored to cooperate with other features and operations of those units. Thus, in order to avoid confusion and enable those skilled in the an to practice the claimed invention, this specification will describe the operation of the present invention using the network block diagram of FIG. 1, the network monitor block diagram of FIG. 2, the network monitor operational flow chart of FIG. 3 and the tables shown in FIG. 4. In the following description, the first digit of an element's reference number designates the first figure where the element is located (e.g., 101 is located in FIG. 1).

Figure 2:
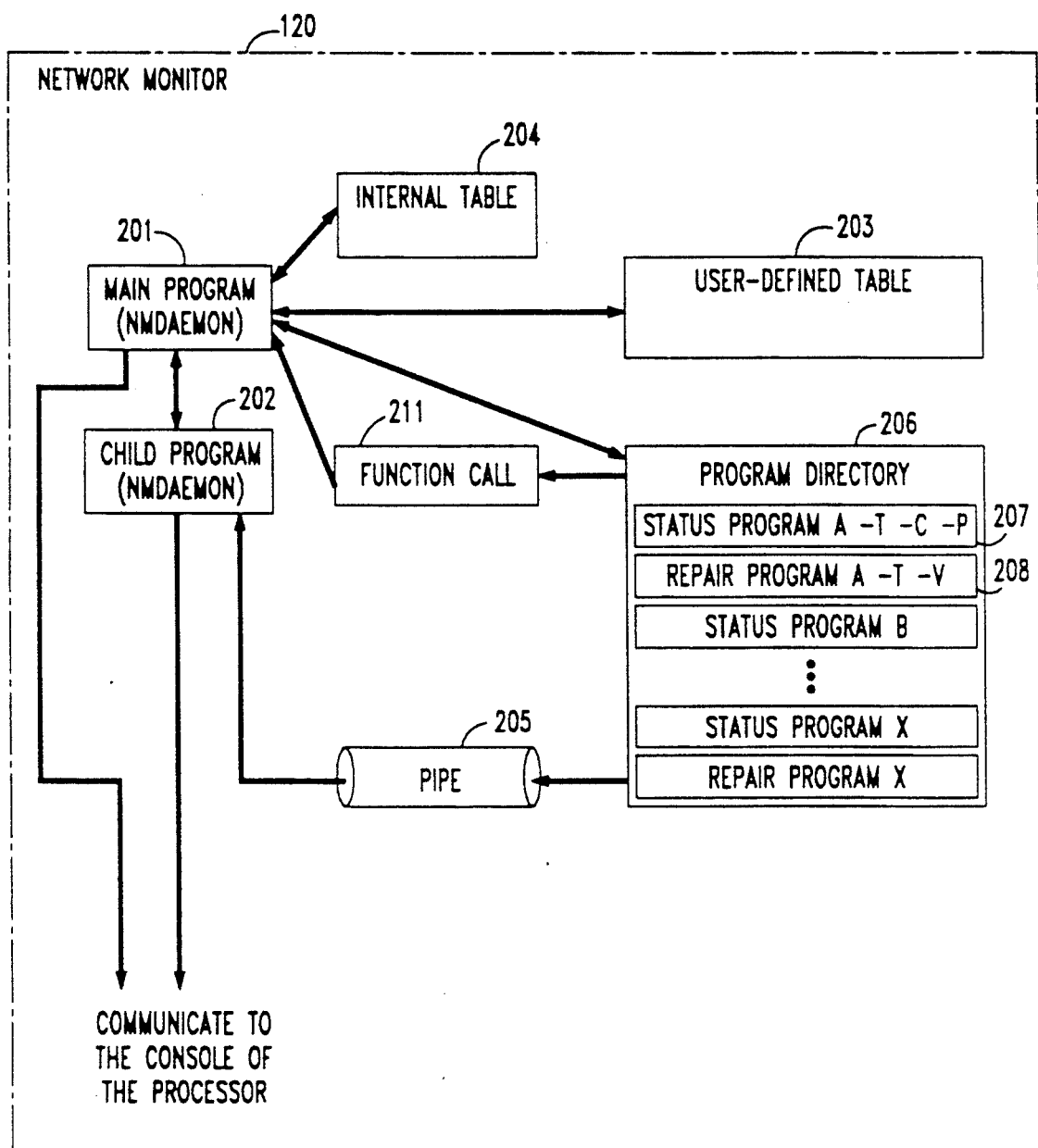
FIG. 2 is a block diagram of the major elements of a network monitor in accordance with the present invention.
Figure 3:
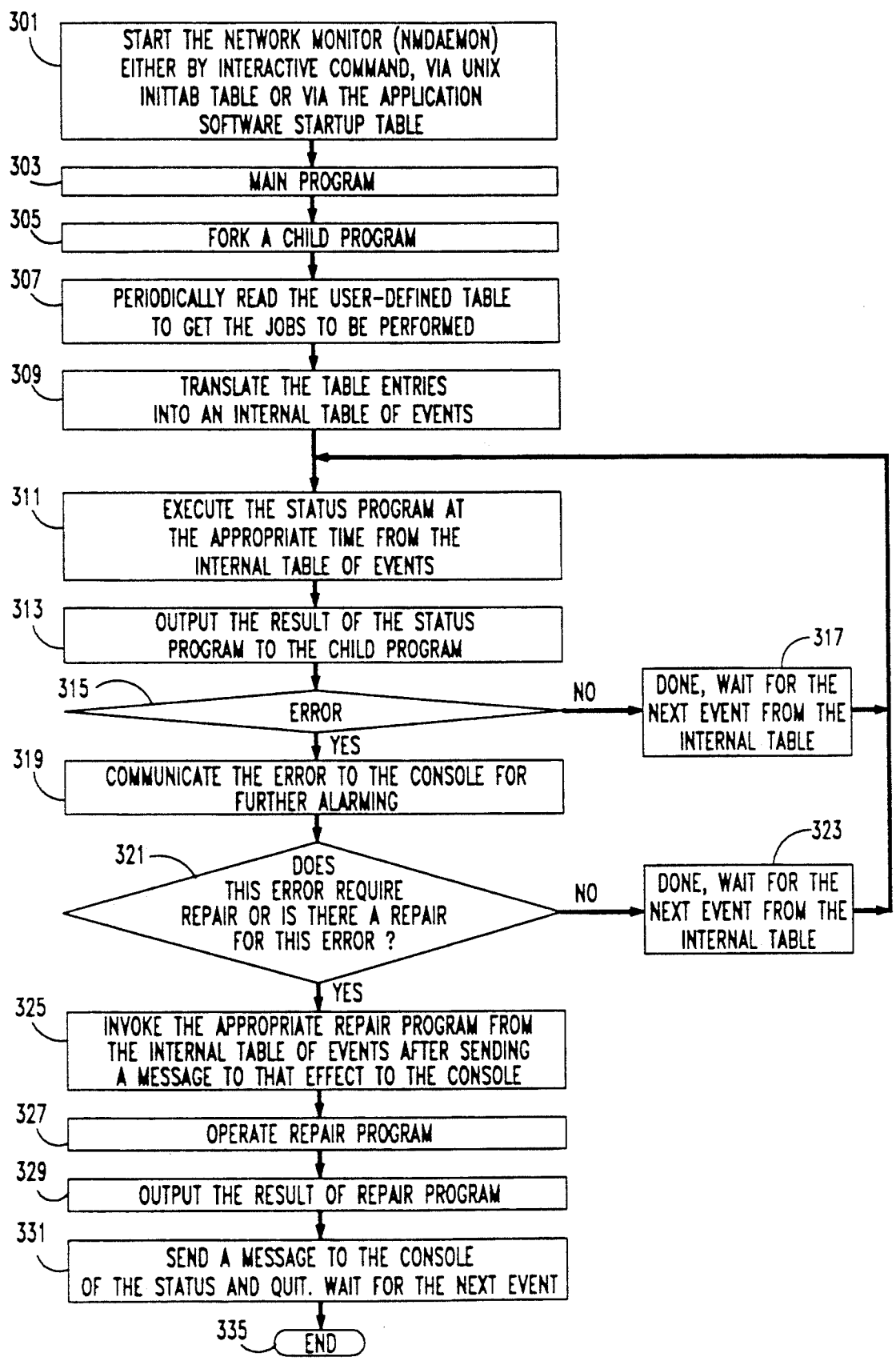
FIG. 3 is a flow chart of the operating program of the network monitor.

As previously noted, FIG. 2 illustrates the various elements of the network monitor program 120. FIG. 3 illustrates a block diagram of the operational steps of the network monitor program 120. FIG. 4 shows how network monitor program 120 periodically translates the entries of the user-defined table 203 into the network monitor internal table 204 which includes a list of all events which are to be performed by network monitor program 120 during the present time cycle or interval. The network monitor program periodically accesses the user-defined table 203 to determine which subroutine status programs should be performed during the present time period. Note, because the network monitor only momentarily accesses user-defined table 203, the table is readily available for the user to add or modify entries in the table without disrupting the normal operations of the network monitor program 120. Thus, the network monitor administrator, illustratively at console 130, can add or change status or repair programs and change time intervals or other parameters associated with these programs without having to stop the monitor program 120. This capability to make changes to the monitor program 120 in real time without having to disable part or all of the network or having to recompile, relink or retest the network monitor program 120 provides operational advantage over existing arrangements.

When any additions or changes are entered by the administrator they will be picked up by network monitor program 120 on its next periodic access of the user-defined table 203 and appropriate changes are made to internal table 204. While it is stated that monitor program 120 operates "periodically" it should be noted that it may more generally operate recurrently, that is without necessarily using the same period of time between consecutive operations of monitor program 120.

The user-defined table 203 contains entries to enable the network monitor 120 to execute programs to discover problems (if any) in a subsystem of the associated CPU processor. Each table entry includes a status program containing test parameters required by the network monitor 120 to execute the status programs to ascertain the status of an associated subsystem at defined time intervals. Each status program may also have an associated repair program listed therewith. The structure of the repair program may also include test parameters as in the status programs. The table 203 consists of entries that are position-dependent and has the following format:

LABEL: TIME INTERVAL: STATUS PROGRAM: REPAIR PROGRAM: COMMENTS The definitions of the fields are:

LABEL: The label is a unique identifier. This identifier's name should be the same as the name of the status program without the test parameters, as listed in the third field.

TIME INTERVAL: The time interval between successive executions of the status program in minutes.

STATUS PROGRAM: This is the checking routine with any valid and available options to execute at the defined time interval. The name of this status program should be identical to the Label because the network monitor program 120 keeps these names in its memory for use in later communications and to identify the repair program associated with this status program since it is executing other programs in parallel.

REPAIR PROGRAM: This is the program that repairs if an error or a problem is detected by the status program. If there is no repair program, then this field will be null. All the required options for this repair program are also specified.

COMMENT: This field provides any additional information needed by the network systems administrator. Such information may include the purpose of this status and repair program, and any impacts thereof.

The above-mentioned user-defined table 203 is read periodically by the network monitor 120 and translated into an internal table 204 which is used by network monitor 120. Internal table 204 represents the table as it appears during the first operating period- time cycle A. is internal table 204 is a well-defined linked list of job items (a conventional programming practice) or events to be perforated during time cycle A. This list consists of the same fields, 451–455, as the use defined table 203 entries, and also includes a link pointer 456 to the next element in the list. The link pointer 456 indicates the next item (i.e., 412–414) in the event sequence for the network monitor 120 to perform. As will be described below in detail, every time the user-defined table 203 is updated, this internal table 204 is automatically updated in the next reading cycle of network monitor 120. Thus, during the next operating period-time cycle B, the internal table will appear as shown by 204A.

In the following discussion, we assume that network monitor 120 periodically runs status programs every 30 minutes, i.e., each time cycle is 30 minutes apart. During time cycle A, the network monitor accesses user-defined table 203 and determines from time interval column 452 which of the status programs, items 401–404, should be run. The entries in the time interval column 452 for item 401 indicate that for subsystem A the status program A and repair program A should be run and hence item 411 is derived from item 401 and entered into internal table 204. Note, all of the associated information elements in columns 451–454 are loaded into the appropriate columns of internal table 204 for item 411. Additionally, user-defined table 203 indicates that item 402 also deals with subsystem A and specifies that status program A1 and repair program A1 should also be run. Thus, normal testing of subsystem A requires that both status programs A and A1 be run at their respective times. To accomplish this, item 412 derived from item 402 is entered in internal table 204. Similarly, items 412 and 414 are derived from items 403 and 404 and entered in internal table 204.

Consequently, during time cycle A, network monitor 120 would run the enumerated status programs A and A 1, B, and X, for subsystems A, B, and X, respectively, as shown by items 411–414. As will be discussed later, if an error is returned by any of the status programs A, A1, B or X, the associated repair program A, A1, B or X is, respectively, activated to eliminate the trouble condition.

At the completion of cycle A, the network monitor 120 becomes inactive until the system clock indicates that 30 minutes have passed since the cycle A functions were performed. At that time, the network monitor 120 starts its next periodic cycle, cycle B. Note, internal table 204 is periodically updated from the user-defined table 203 on a much shorter interval (e.g., 1 minute). Shown by 204A are the contents of the internal table after having been periodically updated from the user-defined table 203. We assume that internal table 204 was updated before time cycle B activities are started by network monitor 120.

Note, item 401 indicates that status program A should be run every 30 minutes. Hence, status program A would again be run for subsystem A during cycle B. Note that item 402, status program A1, would not be run during cycle B because its time interval entry 452 specifies that it is to be run every 60 minutes. Hence, since only 30 minutes have elapsed between cycle A and cycle B, item 402 is not run by network monitor 120 during cycle B. Item 403 shows that status program B 1 is to be run, rather than status program B. This has occurred, illustratively, because the network monitor administrator has changed user-defined table 203, by substituting status program B1 for status program B. This may have occurred any time after the network monitor 120 generated internal table 204 for cycle A but before internal table 204A was generated for cycle B. However, any time the user-defined table 203 is changed, the internal table 204 is immediately changed and the time-cycle starts again, irrespective of the previous time cycle. Note, in our example, that no associated change has been made to the repair program B which is invoked when an error is detected in status program B1.

Note, that while in the present embodiment the time entry 452 for the performance of the various status programs in user-defined table 203 was specified as a time interval, the program could be modified to enable status programs to operate at a specified time (e.g., at 12:00 noon). In such a scenario, the status program would probably operate once a day. Obviously, the time entry could also include one or more specific days of the week, month, year etc., at which time a status program should run.

With joint reference to FIGS. 2, 3, and 4, we now describe the overall detailed operation of the present invention. The network monitor ! 20 is programmed to run on a CPU which operates using a UNIX ® operating system. (UNIX is a registered trademark of UNIX System Laboratories). Obviously, the network monitor 120 could be adapted to operate on other well-known operating systems. The network monitor program includes the main program or process designated Nmdaemon 201.

Nmdaemon 201 is a UNIX system program that runs continuously in the background of CPU (e.g., 110) as a daemon process. The daemon process implements centralized logging and alerting functions. Note, UNIX system daemon processes are not associated with any users but do system-wide functions, such as administration and control of networks, execution of time-dependent activities, line printer spooling, and so on. This main program process is activated at CPU startup or it can be started/stopped at any given time using the following network program 120 options:

Nmdaemon -n: should stop the execution of any Nmdaemon process that is currently running and start a new one.

Nmdaemon -f: should terminate the execution of the current Nmdaemon process.

This main daemon program forks (generates) a child program or process 202 (hereinafter child program) to do certain miscellaneous tasks that are associated with this program.

This main nmdaemon 201 periodically reads the user-defined table 203 to get the job items to be perforated and translates the user entries (including all the test parameters) and builds an internal table 204. The main nmdaemon program 201 then obtains the needed status and repair program indicated by internal table 204 from program memory and then instructs the child program 202 to monitor the status of the event execution. Directory 206 stores all the status and repair programs and associated information needed by network monitor 120. These status and repair programs are developed by the user depending on their local application. These programs use a well-defined function call 211 to interface with the main program 201. These programs can have their own set of options to run with and they communicate with the child program 202 via a pipe 205. All of these status and repair programs return the appropriate codes for further processing by the main program 201.

The main program 201 executes the specified status checking programs at the appropriate time based on the entries in internal table 204 and directs the status programs to direct their output to the child program via common pipe 205 or via a function call 211 as the case may be.

The child program 202 does certain miscellaneous tasks and communicates with the various status and repair programs and reports to the main program 201 for it to take further action and thereafter obtains the next set of tasks to be performed by itself. All the status checking and repair programs report their results to this child program 202 via a common pipe 205. (A pipe is a UNIX operating system process which enables the connecting of commands so that several programs can communicate to one program without interrupting that one program for every call). The results are also communicated to the local CPU console (e.g., 130) for further alarming, if necessary.

The results of the status program are analyzed by main program 201 to determine if it is necessary to repair and then checks to see if there is an associated repair program to execute in internal table 204 based on the status program's unique identity. The main program 201 then invokes the appropriate repair program and instructs the child program 202 to take care of all the outputs from these repair programs and communicate them to the main program 201 at the appropriate time.

With joint reference to FIGS. 2 and 3, the sequence of operations of the network monitor 120 program is described. In step 301, the network monitor 120 is started using a well-known interactive command, or via a UNIX system INITTAB entry, (not shown) or using a well-known application software startup table (not shown). In step 303, the main program 201 (Nmdaemon process) is activated and, in step 305, forks or generates a child program 202 (i.e., a child Nmdaemon process). In step 307, the main program 201 periodically (every 30 minutes in our example) reads the user-defined table 203 to get a list of the job items or tasks to be performed by the network monitor program 120 during the present operating cycle. In step 309, the main program 201 translates the entries from the user-defined table 203 into entries for the internal table 204 (in a manner as previously described).

In step 311, the child program 202 executes, in parallel, the job items or events listed in the internal table 204. This involves obtaining the identified status program from program directory 206 and executing the identified status program. In step 313, the results obtained by executing the status program are outputted (via pipe 205) to the child program 202. These results are compared, by child program 202, with the expected results obtained from the status program. If the results obtained are within predetermined limits, the process is completed, and the child program 202 waits for the next job task or event to be assigned by the main program 201. If the status program results are outside the predetermined limits, an error condition is communicated, in step 319, to the main program 201 via a function call which is a write command (e.g, a UNIX system command nonwrite). The main program communicates this error condition to the console associated with the CPU running the network monitor program 120.

In step 321, the main program 201 checks the internal table 204 to determine if this error is to be corrected using a repair program associated with the status program which has just been run. For example, if job item 411, which is status program A, has just been run, the associated repair program would be repair program A.

The repair program A may include test parameters such as -t5, -V. Note, these test parameters may optionally be specified by the system administrator or may be preprogrammed default parameters. For example, assume that the status program A was a clock check program. If an error was reported by the status program A indicating that a clock of a certain CPU was incorrect, a repair program A could be invoked to correct the clock. The repair program will then correct the clock if it is in error by in excess of 5 minutes (i.e., -t5) correction if the verify option (i.e.,-V) was set. Thereafter, the repair program sends an appropriate message to the console of the processor (CPU). The repair program identity appears in column 454, a null field indicating no repair program exists for the associated status program.

If there is no repair program to correct this error, then in step 323, the job item is complete and Control returns to step 311 to wait for the next event or job items to be obtained from internal table 204.

If a repair program exists, then, in step 325, the main program 201 invokes the associated repair program after sending a message to that effect to the system console. In step 327, the main program obtains the identified repair program from program directory 206 and executes it. In step 329, the results of operating the repair program are outputted (via pipe 205) to the child program. In step 331, the status of the repair program is sent in a repair message to the main program 201 via a function call 211 and a message is sent to the associated console. Thereafter, the child program awaits to be assigned another job item by the main program 201 from internal table 204. If no other job items exist, the operation ends in step 335.

While the user-defined table 203 illustrates one repair program associated with a status program it should be understood that the same repair program could be associated with many status programs. Moreover, several repair programs can be identified in column 454 for use with the same status program. For example, if an error exists in status program A the system may invoke successively more complicated repair programs in an attempt to solve the problem. Note, the label 451 need not be the same as the status program name but only needs to be unique in the user-defined table.

While the present invention was described as a "network" monitor system it could also have been implemented as a "processor monitor" program which would monitor the status and initiate repairs to other programs, processes or functions of the processor or any other application residing on that processor.

In addition to the disclosed functions, the repair program can also perform the following function: signal a system administrator when the repair program has not been successful, change and/or substitute either the test parameters of the status programs or the status programs themselves (453 of FIG. 4), change and/or substitute parameters of the operating programs (and/or application programs) or the operating programs (and/or application programs) themselves, and change and/or substitute hardware configurations of the system. Additionally, the repair program can also be used to send system status messages to the customers when predefined conditions arise. The repair program can also change the time for scheduling (i.e., time interval 452 of FIG. 4) each of the status programs.

What has been described is merely illustrative of the application of the principles of the present invention. Other arrangements and methods can be implemented by those skilled in the art without departing from the spirit and scope of the present invention.

I claim:

1. A network monitor system for use in a communication network, said network monitor system comprising
 a plurality of status programs for determining an operating status of a plurality of subsystems of the network, while the network is active providing communication services using said subsystems, one or more status programs including one or more changeable test parameters for indicating a normal status of said subsystems of the network, said test parameters being changeable without disabling the operation of either said network monitor system or said subsystems,
 at least one repair program for automatically repairing a non-normal status of an associated one or more subsystems said repair program automatically performing its repair operation on said non-normal subsystems without disabling the operations of either said network monitor system or said non-normal subsystems,
 means for recurrently executing, under system control, one or more of said status programs and responsive to said non-normal status returned from the one or more of said status programs for automatically enabling said associated at least one repair program.

2. The system of claim 1 wherein a system administrator specifies one ore more of said test parameters for at least one status program.

3. The system of claim 1 further comprising table means for associating one or more of said plurality of status programs with one of said at least one repair program.

4. The system of claim 3 wherein said table means includes a user-defined table which identifies one ore more subsystems of the system and associates therewith at least one status program and at least one repair program.

5. The system of claim 4 wherein said user-defined table includes a user-specified time when said at least one status program should be executed.

6. The system of claim 5 wherein said user-specified time is the time interval between consecutive executions of said at least one status program.

7. The system of claim 4 wherein said table means further includes a predetermined time when the status of at least one of the one or more subsystems of the system is checked by executing its associated at least one status program.

8. The system of claim 7 including means for translating entries of said user-defined table into entries for an internal table and wherein entries of said internal table specify the time interval between consecutive executions of said at least one status program.

9. The system of claim 8 wherein said internal table means is periodically translated from said user-defined table and wherein said user can make changes to said user-defined table at any time.

10. A network monitor system for use in a communication network comprising
 a first group of status programs for determining operating statuses of subsystems used to control the network, while said network is active providing communication services, one or more status programs including one or more use-specified changeable test parameters for determining a normal status of an associated operating subsystem, said test parameters being changeable without disabling the operation of either said network monitor system or said subsystems,
 a second group of repair programs for automatically repairing a non-normal status of an associated operating subsystem, said repair programs operating automatically without disabling the operations of either said non-normal subsystems or said network monitor system,
 a table including said first group of status programs and associating therewith said second group of repair programs, and
 means for accessing said table recurrently, under network monitor system control, to perform one or more status programs and for automatically enabling an associated one or more repair programs when a non-normal status response is returned from said one ore more status programs.

11. A communication network comprising
 a plurality of subsystems for providing communication services of said network, and
 a network monitor system including
 a first group of status programs for determining operating statuses of said subsystems, while said subsystems are active providing communication services of said network, each status program including one or more user-specified changeable test parameters for indicating the status of an associated subsystem, said test parameters being changeable without disabling the operation of either said network monitor system or said subsystems, and at least one repair program for automatically repairing a non-normal status of an associated subsystem, said at least one repair program operating automatically without disabling the operations of either said non-normal subsystem or said network monitor system, means for recurrently executing a status program, under a status program control, and responsive to a non-normal status returned from said status programs for automatically enabling said associated at least one repair program.

12. The network of claim 11 wherein a system administrator specifies one or more of said test parameters for at least one status program.

13. A method of operating a network monitor system for use in a communication network comprising the steps of determining an operating status of the network using one ore more of a plurality of status programs, which are system activated on a recurrent basis while said network is active providing communication services, one ore more status programs including one or more user-specified changeable test parameters for indicating a normal status of a subsystem of said network, said test parameters being changeable without disabling the operation of either said network monitor system or said subsystems, and automatically enabling at least one associated repair program for repairing a determined non-normal operating status of an associated one or more subsystems, said at least one associated repair program automatically performing its repair operation on said non-normal subsystems without disabling the operations of either said network monitor system or said non-normal subsystems of said network.

14. A method of operating a communication network, comprising the steps of providing communication services of said network using one or more subsystems, determining an operating status of the network using a network monitor system including one or more of a plurality of status programs, which are activated by a status program on a recurrent basis while said network is active providing communication services, one or more status programs including one or more user-specified changeable test parameters for indicating a normal status of an associated subsystem, said test parameters being changeable without disabling the operation of either said network monitor system or said subsystems, automatically enabling at least one associated repair program of said network monitor system for automatically repairing a determined non-normal operating status of an associated subsystem, said at least one associated repair program automatically performing its repair operation on said non-normal associated subsystem without disabling the operations of either said network monitor system or said non-normal subsystem of said network.

15. The system of claim 1 wherein at least one of said status or repair programs is changeable by a system administrator without affecting the operation of either said network monitor system or said subsystems of the network.

16. The method of claim 13 further comprising the step of changing at least one of said status or repair programs without affecting the operation of either said network monitor system or said subsystems of the network.

* * * * *